(12) United States Patent
Wu et al.

(10) Patent No.: US 9,919,374 B2
(45) Date of Patent: Mar. 20, 2018

(54) ROBOTIC GRIPPER SENSOR

(71) Applicant: TYCO ELECTRONICS CORPORATION, Berwyn, PA (US)

(72) Inventors: Huadong Wu, Hershey, PA (US); Yasser M. Eldeeb, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 327 days.

(21) Appl. No.: 14/879,569

(22) Filed: Oct. 9, 2015

(65) Prior Publication Data

US 2017/0100795 A1    Apr. 13, 2017

(51) Int. Cl.
*B23K 3/08* (2006.01)
*B23K 1/005* (2006.01)
*B23K 37/00* (2006.01)
*B23K 37/04* (2006.01)

(52) U.S. Cl.
CPC ............ *B23K 3/087* (2013.01); *B23K 1/0056* (2013.01); *B23K 37/00* (2013.01); *B23K 37/04* (2013.01)

(58) Field of Classification Search
CPC ................................ B23K 37/00; B23K 37/04

USPC ............ 219/121.66, 121.85; 228/179.1, 212, 228/44.3, 49.1; 700/258, 260
See application file for complete search history.

(56) References Cited

U.S. PATENT DOCUMENTS

| 4,718,164 A | * | 1/1988 | Hokanson | H05K 13/06 29/760 |
| 6,606,891 B1 | * | 8/2003 | McGowan | H01B 17/325 29/715 |
| 9,331,447 B2 | * | 5/2016 | Charlton | H01R 43/0486 |

* cited by examiner

*Primary Examiner* — Samuel M Heinrich

(57) ABSTRACT

A gripper sensor device for aligning fine wires. The robotic gripper sensor device including a housing having a probe receiving cavity. A sensor probe is positioned in the probe receiving cavity. An arm of a positioning member includes a wire engagement section for engaging respective fine wires and a probe engagement section for engaging a portion of the sensor probe. As the wire engagement section is moved into cooperation with the wire, force is applied to the arm of the positioning member causing the probe engagement section to move relative to the portion of the probe, causing the probe to convert a stress change of the portion of the probe into a force reading.

20 Claims, 3 Drawing Sheets

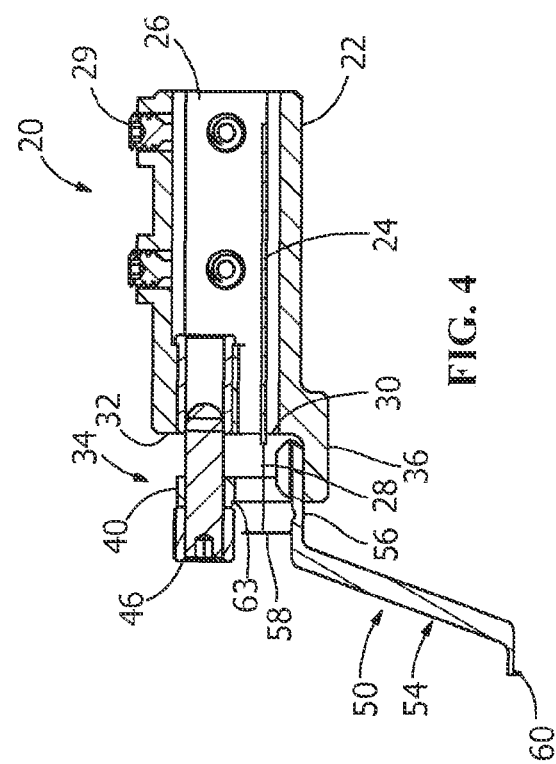
FIG. 3
FIG. 4
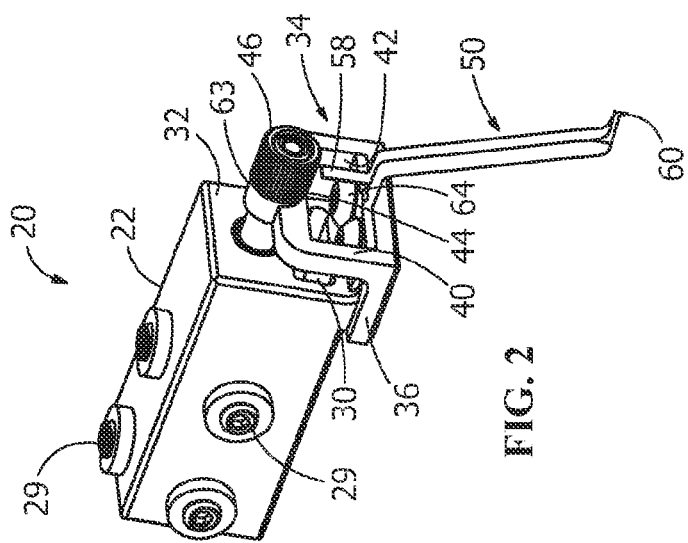
FIG. 2

ROBOTIC GRIPPER SENSOR

FIELD OF THE INVENTION

The present invention is directed to a fine wire robotic gripper sensor. More particularly, the present invention is directed to a fine wire robotic gripper with a built-in force sensor which is used to align fine wires in a fixture.

BACKGROUND OF THE INVENTION

Wire soldering can be a complex process, especially when working with small wires and small termination traces on circuit boards. Soldering can require substantial complicated manual operations almost at the limit of hand-eye coordination systems' capability aided by microscopes to properly align and terminate the small wires. For example, soldering wires of sizes 44 American Wire Gauge (wire diameter of 0.050 millimeters) onto pad traces having widths of 0.050 millimeters, with gaps of 0.050 millimeters between such pad traces, onto a substrate laminate having a thickness of 0.025 millimeters is extremely difficult and is possible only under microscope.

On average, it takes more than three hours for a well-trained human operator to align the wires and complete such soldering of a typical component having 64 solder joints. The cost associated with the well-trained operator expending such an amount of time results in such components is fairly expensive and limited in supply. In addition, although the well-trained operators are able to produce a high quality component, the soldering quality within the 64 solder joints is inconsistent. Some of the solder joints will have higher quality than other solder joints. The inability to have all of the solder joints at the higher quality is an overall limitation of such techniques.

The traditional hot iron tip soldering process by a human operator involves many complicated maneuvers and delicate wire manipulation operations, including: (1) straightening a section of the wire, positioning and aligning it onto its corresponding pad trace; (2) holding the aligned wire section in place at clamping points so the to be soldered section is visible and accessible by the hot iron tip (force feedback control is practically excised to keep proper touch during the solder reflowing process when the wire-pad relative position may change); (3) moving the hot iron tip to touch the soldered sections and to reflow the already pre-tinned solder material; and (4) removing the hot iron tip quickly, finishing contact once the reflowing is observed to reach the required span and the soldered wire is properly seated in place.

Generally, robotic positioning and manipulation of the fine wires has not been utilized in such circumstances due to the complexity and the delicate nature of such components. Robotically manipulating fine wires where high accuracy with very delicate force sensing feedback capabilities has proven to be difficult. This is particularly true in environments, such as in a laser soldering process, in which the robotic manipulation device encounters thermal shock and the like. Consequently, existing high-accuracy feedback enabled robotic systems are too fragile to be used in such wire soldering automation processes.

It would, therefore, be beneficial to provide a robotic manipulation device that includes one or more improvements in comparison to the prior art. In particular, it would be beneficial to provide a robotic wire manipulation device which provides high-accuracy force feedback and which can be used in wire soldering automation processes to facilitate the automated alignment of the wires.

SUMMARY OF THE INVENTION

An embodiment is directed to a robotic gripper sensor device for aligning fine wires. The robotic gripper sensor device including a housing having a probe receiving cavity. A sensor probe is positioned in the probe receiving cavity. An arm of a positioning member includes a wire engagement section for engaging respective fine wires and a probe engagement section for engaging a portion of the sensor probe. As the wire engagement section is moved into cooperation with the wire, force is applied to the arm of the positioning member causing the probe engagement section to move relative to the portion of the probe, causing the probe to convert a stress change of the portion of the probe into a force reading.

An embodiment is directed to a gripper sensor device for use with a laser soldering process. The gripper sensor device includes a housing having a probe receiving cavity. A sensor probe is positioned in the probe receiving cavity. An arm of a positioning member includes a wire engagement section for engaging respective fine wires and a probe engagement section for engaging a portion of the sensor probe. The probe engagement section and the wire engagement section extend in different planes. The sensor probe is removed from the area of laser soldering to prevent damage to the sensor probe due to the robotic wire manipulation impact and the thermal shock of the laser soldering process.

An embodiment is directed to a gripper sensor device to align fine wires for use with a laser soldering process. The gripper sensor device includes a housing having a probe receiving cavity. A sensor probe positioned in the probe receiving cavity. An arm of a positioning member includes a wire engagement section for engaging respective fine wires and a probe engagement section for engaging a portion of the sensor probe. The arm has a weakened portion, wherein a lateral force applied to the wire engagement section causes the wire engagement section and the probe engagement section to pivot about the weakened portion.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a perspective view an illustrative embodiment of the fine wire robotic gripper sensor device removed from the wire soldering device.

FIG. 3 is a top view of the fine wire robotic gripper sensor device of FIG. 2.

FIG. 4 is a cross-sectional view of the fine wire robotic gripper sensor device taken along line 4-4 of FIG. 3.

DETAILED DESCRIPTION OF THE INVENTION

Figure 1:
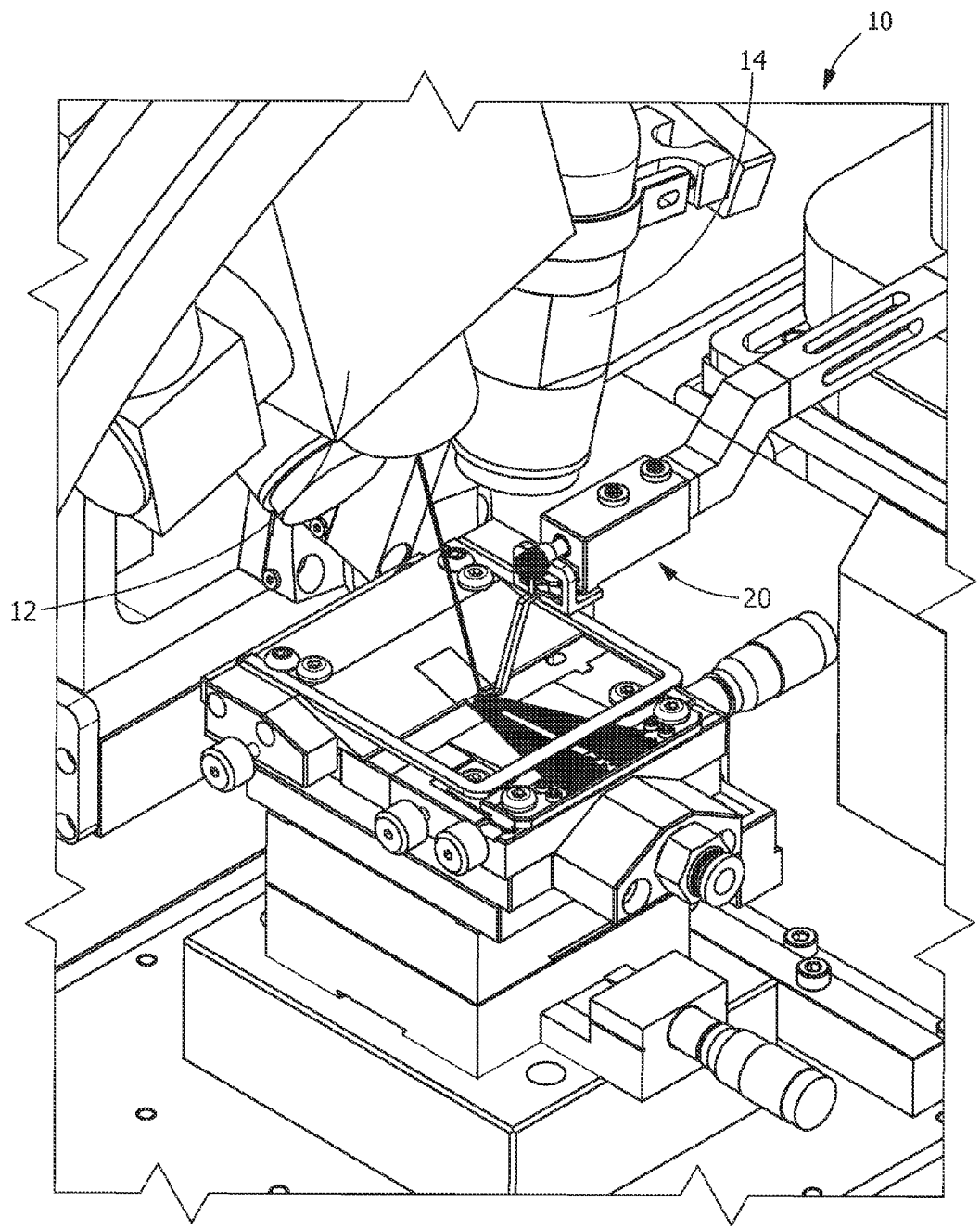
FIG. 1 is a perspective view of an illustrative embodiment of a wire soldering device which includes a fine wire robotic manipulation gripper sensor device according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring to FIG. 1, an illustrative embodiment of a wire soldering device 10 is shown. The device 10 includes a laser 12 which can generate a laser of varying intensity. The device 10 also includes a detection device 14, such as, but not limited to, computer vision system cameras capable of sensing infrared and visible light from a long distance.

The laser soldering process includes a first or initial step of beaming a lower-intensity laser beam from the laser 12. The infrared laser reflection or feedback of the lower-intensity laser beam in relation to the fine wire and the conductive member on the substrate is analyzed, either directly or indirectly using the detection device 14. Based on the feedback, the position of the lower-intensity laser beam of the laser 12 is adjusted to fine-tune its position and incident angle of the lower-intensity laser beam, resulting in the lower-intensity laser beam being moved to a second position. Once the lower-intensity laser beam has been properly adjusted, the higher-intensity laser beam of the laser 12 is beamed at the same position with the same incident angle, such that the higher-intensity laser beam corresponds with the infrared feedback of the lower-intensity laser beam. The lower-intensity laser beam generates intensity and a lower temperature below the soldering temperature determined by the solder material pre-tinned on the wire and the conductive member beneath, such that the solder material is not melted until the beam is properly adjusted. In contrast, the higher-intensity laser beam has an intensity resulting in a temperature above the soldering temperature threshold with an experimentally pre-determined intensity-over-time profile which generates a higher temperature above the soldering temperature, thereby allowing the higher-intensity laser beam to melt the solder when the higher-intensity laser beam is positioned at the optimum position to ensure proper solder material to reflow to reform a high-quality bonding.

The fine wires may be wires having a diameter of less than 0.5 millimeters, including, but not limited to, 0.3 millimeters (AWG 30), 0.2 millimeters (AWG 32), 0.1 millimeters (AWG 38), 0.09 millimeters (AWG 39) and 0.05 millimeters (AWG 44).

The substrate maybe a rigid or flexible material composite structure with conductive members made of compatible material with the solder material. Examples include, but are not limited to, small and thin conductive printed metallic circuit traces/pads on a printed circuit board. In one illustrative embodiment, the conductive member is copper base conductive metallic alloy trace pads bonded onto a flexible material, for example, a polyimide material substrate. The conductive member has a thickness depending upon the materials and arrangement utilized. Suitable thicknesses of the conductive member include, but are not limited to, 0.5 millimeters (for example, IPC L4), 0.2 millimeters (for example, IPC L4), 0.15 millimeters (for example, IPC L3), 0.10 millimeters (for example, IPC L2), 0.05 millimeters (for example, IPC L1).

A more detailed description of the soldering process associated with the illustrative embodiment of the wire soldering device 10 can be found in U.S. patent application Ser. No. 14/879,479, entitled Laser Soldering Process, filed on even date herewith, which is hereby incorporated by reference in its entirety.

The geometric structure and dimensions of the conductive member, the substrate upon which the conductive member is positioned, the solder material, and/or their relative positions are compatible with the laser soldering process. For example, in one illustrative embodiment, the total thickness of the conductive member and/or substrate is 0.051 millimeters, in which the conductive member is a double-sided component having printed circuitry traces with pitch as narrow as 0.1 millimeters and circuitry trace and pad width as narrow as 0.051 millimeters, the conductive member having a complex geometric structure and very fine scale dimensions which causes soldered components to be venerable to thermal stress damage. Accordingly, the laser soldering process accurately controls the laser beam location, the incident angle and the laser beam power intensity profile such that the resulting peak temperature of the conductive member and the substrate has a large safety margin below the conductive member and the substrate maximal allowable temperature and, ideally, below a maximum 260° C. working temperature to prevent degradation of the conductive member and/or the substrate. Stated differently, laser power intensity of the higher-intensity laser beam is controlled to ensure that given the thickness of the conductive member and/or substrate is greater than a suitable thickness that prevents thermal degradation of the conductive member and/or substrate.

In order to effectively and securely terminate the fine wires to the conductive members of the substrate, a force-measuring robotic gripper sensor device 20 is used to manipulate and align conductor wires accurately to their corresponding conductive members and/or to maintain a desired pressure force on the wires to hold the wires on the conductive members. The robotic gripper sensor device 20, as best shown in FIGS. 2 through 4, is configured to have high accuracy with very delicate force-sensing feedback capabilities. This allows the device 20 to manipulate the individual wires without breaking or damaging the wires. In addition, the construction of the device 20 allows the device 20 to withstand the robotic wire manipulation impact and the thermal shock associated with the laser soldering process.

As best shown in FIG. 4, the gripper sensor device 20 includes a housing 22 for housing a sensor probe 24 therein. The sensor probe 24 is a type of microforce sensor. In one illustrative embodiment, the sensor probe 24 is capable of measuring forces from millinewtons ($10^{-3}$ N) down to several nanonewtons ($10^{-9}$ N) along the sensor's probe axis.

Both compression and tension forces can be measured. One such sensor probe 24 is the Femto FT-S100000 Mechanical Probe which is commercially available.

The sensor probe 24 is housed in a probe receiving cavity 26 of the housing 22 to provide physical support and protection to the sensor probe 24, thereby protecting the components of the sensor probe 24 from unwanted contact and exposure to potentially damaging elements. A vulnerable force-sensing probe potion or tip 28 extends or protrudes from the probe 24 through an opening 30 in a front wall 32 of the housing 22 and engages with a spring flap or probe engagement section 58 to provide a force input signal, as will be more fully described. Mounting hardware or set screw 29 is provided to properly hold the sensor probe 24 in the housing 22.

As best shown in FIGS. 2 and 4, a screw-adjustment member 46 and cantilever-structure adjustment frame 34 interaction mechanism is specially designed to pull and partially bend the frame or adjustment wall 40 towards the front wall 32 to provide extremely fine-tune (micron and sub-micron scale) adjustment for the engagement between original probe tip 28 and the probe engagement section 58 of positioning member 50, which is mounted on adjustment wall 40. In the illustrative embodiment shown, the cantilever-structure adjustment frame 34 has a base 36 which is integrally molded to the housing 22. However, other methods of attaching the cantilever-structure adjustment frame 34 to the housing 22 may be used without departing from the scope of the invention.

An adjustment wall 40 extends from the base 36. The adjustment wall 40 is spaced from the front wall 32. In the illustrative embodiment shown, the adjustment wall 40 is essentially parallel to the front wall 32 when the adjustment wall 40 is in an initial, unstressed position. The adjustment wall 40 has an opening 42 and a recess 44 to form a movable structure that has the desirable controlled-deformation effects. The recess is dimensioned to receive and cooperate with the adjustment member 46, such as but not limited to a screw-adjustment member, as will be more fully described below.

Figure 5:
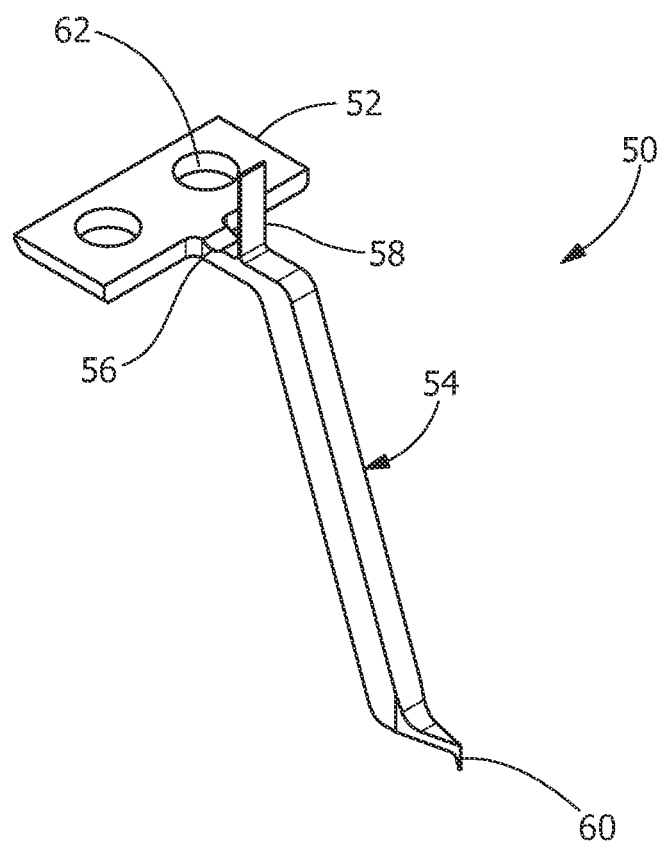
FIG. 5 is a perspective view of an engagement arm of the fine wire robotic gripper sensor device.

A deflecting and cantilever-positioning member 50, as best shown in FIG. 5, includes an attachment portion 52 and an arm 54. The arm 54 includes a deliberately weakened section 56, a probe engagement section 58 and a wire engagement section 60. The attachment portion 52 is dimensioned to be positioned adjacent the base 36 of the cantilever-structure adjustment frame 34. One or more openings 62 positioned in the attachment portion allow for mounting hardware 64 to extend therethrough to mount the attachment portion 52 to the base 36. However, other methods of mounting the positioning member 50 to the housing 22 and/or the cantilever-structure adjustment frame 34 may be used without departing from the scope of the invention.

With the deflecting and cantilever-positioning member 50 properly secured to the base 36, the arm 54 extends through the opening 42 in the adjustment wall 40, thereby allowing the arm 54 to extend beyond the housing 22 and the adjustment wall 40. In the illustrative embodiment shown, the weakened portion 56 has a reduced cross-sectional area as compared to the remainder of the arm 54. In the embodiment shown, the weakened portion 56 has arcuate structure and surface geometric tolerance-control requirements to achieve designed force-deflection relationship characteristics. The weakened portion 56 is configured as the pivot axis to allow the probe engagement section 58 and the wire engagement section 60 to move relative to the attachment portion 52 and housing 22 with kinematic and dynamic characteristics of a cantilever mechanism with designed force magnification function.

The wire engagement section 60 is provided at the end of the arm which is opposed to the end with the attachment portion 52. The wire engagement section 60 is dimensioned to allow the wire engagement section 60 to be inserted between individual wires and to cooperate with individual wires.

The probe engagement section 58 extends from the arm 54 in a direction to be positioned proximate to and to cooperate with the original probe tip 28 of the probe 24. In one illustrative embodiment, in the initial unstressed position, in which the wire engagement section 60 is not in contact with a wire, the probe engagement section 58 is fine-tune adjusted to be just in contact with the probe tip 28 of the probe, such that the gripper sensor device 20 is calibrated to sense a defined force very close to zero. In another illustrative embodiment, in an initial unstressed position, in which the wire engagement section 60 is not in contact with a wire, the probe engagement section 58 is fine-tune adjusted to be adjacent the probe tip 28 of the probe such that the overall sensing system is calibrated to have zero-offset reading.

In the illustrative embodiment shown in FIGS. 2 through 5, the arm 54 has a bend such that the weakened portion 56 and the wire engagement section 60 are in different planes and the probe engagement section 58 and the wire engagement section 60 are in different planes. The arm 54 has a small bend deflection pivoting point at the weakened portion 56 such that a lateral force applied to the wire engagement section 60 as the wire engagement section 60 moves wires in a direction perpendicular to the probe engagement direction, the probe engagement section section 58 is rotated relative to the probe tip 28. However, other configurations of the arm 54 may be used, for example to achieve other angle direction change, without departing from the scope of the invention.

With the probe 24 properly positioned in the housing 22 and the set screw 29 tightened such that the probe tip 28 is very close to the probe engagement section 58, the screw-adjustment member 46 provides a pulling force towards the housing 22 while bending a cantilever-structure 36 and 40 to achieve extremely fine-tune adjustment. The screw-adjustment member 46 passes through the recess 44 of the cantilever-structure adjustment frame 34 as the tip part of frame 40. The screw adjustment member 46 has a shoulder part 63 which cooperates with the adjustment wall 40 to move adjustment wall 40, the cantilever-structure adjustment frame 34 and ultimately the positioning member 50 and the probe engagement section 58 as the adjustment member 46 is moved. This allows the probe 24 and the probe engagement section 58 to be properly calibrated prior to use.

In operation, with the wires in general alignment with the conductive members of the substrate, the gripper sensor device 20 is activated to move and secure the wire in precise alignment with the conductive members until the laser soldering process is completed. The activation of the gripper sensor device 20 is performed by a robot or by other known methods of controlling a component of a larger device.

Once activated, the wire engagement section 60 of the gripper sensor device 20 is moved into engagement with an individual wire. The movement is monitored by the detection device 14 which provides input to the robot controller. The movement of the wire engagement section 60 is also monitored by the sensor probe 24 which also provides input to the robot controller. The combined input ensures that the wire engagement section 60 of the gripper sensor device 20 engages and moves the delicate and fragile wires without damaging or breaking the wires or without damaging the fragile sensor probe 24.

As the wire engagement section 60 is moved into cooperation with the wire, force is applied to the arm 54 of the positioning member 50. The force is transferred through the arm 54 to bend around the deliberately weakened portion 56. Due to the configuration of the weakened portion 56, the lateral force applied to the wire engagement section 60 causes the wire engagement section 60 and the portion of the arm between the wire engagement section 60 and the probe engagement section 58 to pivot about the weakened portion 56. This pivoting causes the probe engagement section 58 to push the probe tip 28 of the probe 24. The probe 24 converts the stress change of the probe tip 28 into a force reading. The force reading may be magnified by a leverage force magnification mechanism quantitatively determined using a finite element analysis model or other known methods.

The positioning of the probe 24 in the housing 22 provides physical support and protection to the sensor probe, thereby protecting the components of the sensor probe 24 from unwanted contact and exposure to potentially damaging elements. Protection of such high accuracy and delicate force-sensing probes is important as such probes are too fragile to be exposed to or positioned near the area where the laser soldering is to occur. Such probes do not have enough strength to fulfill wire manipulation tasks and cannot withstand the thermal shock associated with the laser soldering process.

In the present invention, as described and claimed herein, the probe 24 is removed from the area of laser soldering. The arm 54 is made from material which will not fail or degrade due to the thermal shock of the laser soldering process. This allows the robotic gripper sensor device 20 to withstand the thermal shock associated with the laser soldering process. The enhanced durability of the robotic gripper sensor device 20 allows the robotic gripper sensor device 20 to be suitable for use with large batch production.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A robotic gripper sensor device for aligning fine wires, the robotic gripper sensor device comprising:
a housing having a probe receiving cavity;
a sensor probe positioned in the probe receiving cavity;
a positioning member having an arm, the arm having a wire engagement section for engaging fine wires and a probe engagement section for engaging a portion of the sensor probe;
wherein as the wire engagement section is moved into cooperation with the wire, force is applied to the arm of the positioning member causing the probe engagement section to move relative to the portion of the probe, causing the probe to convert a stress change of the portion of the probe into a force reading.

2. The robotic gripper sensor device as recited in claim 1, wherein the arm has a weakened portion section, wherein a lateral force applied to the wire engagement section causes the wire engagement section and the probe engagement section to pivot about the weakened portion.

3. The robotic gripper sensor device as recited in claim 2, wherein the weakened portion is a reduced cross-sectional area of the arm.

4. The robotic gripper sensor device as recited in claim 2, wherein the weakened portion and the wire engagement section are in different planes.

5. The robotic gripper sensor device as recited in claim 1, wherein the sensor probe is a microforce sensor probe.

6. The robotic gripper sensor device as recited in claim 1, wherein the portion of the sensor probe is a sensing tip which engages the probe engagement section of the positioning member.

7. The robotic gripper sensor device as recited in claim 6, wherein in an initial unstressed position, in which the wire engagement section is not in contact with the fine wires, the probe engagement section is provided in contact with the sensing tip of the sensor probe.

8. The robotic gripper sensor device as recited in claim 1, wherein a mounting frame extends from the housing, the mounting frame cooperates with the positioning member to mount the positioning member to the housing.

9. The robotic gripper sensor device as recited in claim 8, wherein the mounting frame has a cantilever adjustment wall which cooperates with an adjustment member, wherein as the adjustment member is moved, the adjustment member cooperates with the cantilever adjustment wall to move the cantilever adjustment wall and the probe engagement section of the positioning member to properly calibrated the robotic gripper sensor device.

10. A gripper sensor device for use with a laser soldering process, the gripper sensor device comprising:
a housing having a probe receiving cavity;
a sensor probe positioned in the probe receiving cavity;
a positioning member having an arm, the arm having a wire engagement section for engaging respective fine wires and a probe engagement section for engaging a portion of the sensor probe, the probe engagement section and the wire engagement section extending in different planes;
wherein the sensor probe is removed from the area of laser soldering to prevent damage to the sensor probe due to the robotic wire manipulation impact and the thermal shock of the laser soldering process.

11. The gripper sensor device as recited in claim 10, wherein the arm has a weakened portion, wherein a lateral force applied to the wire engagement section causes the wire engagement section and the probe engagement section to pivot about the weakened portion.

12. The gripper sensor device as recited in claim 11, wherein the weakened portion is a reduced cross-sectional area of the arm.

13. The gripper sensor device as recited in claim 12, wherein the weakened portion and the wire engagement section are in different planes.

14. The robotic gripper sensor device as recited in claim 10, wherein in an initial unstressed position, in which the wire engagement section is not in contact with the respective fine wires, the probe engagement section is provided in contact with the sensor probe to apply a defined force.

15. The robotic gripper sensor device as recited in claim 10, wherein a mounting frame extends from the housing, the mounting frame cooperates with the positioning member to mount the positioning member to the housing.

16. The robotic gripper sensor device as recited in claim 15, wherein the mounting frame has a cantilever adjustment wall which cooperates with an adjustment member, wherein as the adjustment member is moved, the adjustment member cooperates with the cantilever adjustment wall to move the cantilever adjustment wall and the probe engagement section of the positioning member to properly calibrated the robotic gripper sensor device.

17. A gripper sensor device to align fine wires for use with a laser soldering process, the gripper sensor device comprising:

a housing having a probe receiving cavity;
a sensor probe positioned in the probe receiving cavity; and
a positioning member having an arm, the arm having a wire engagement section for engaging respective fine wires and a probe engagement section for engaging a portion of the sensor probe, the arm having a weakened portion, wherein a lateral force applied to the wire engagement section causes the wire engagement section and the probe engagement section to pivot about the weakened portion.

18. The gripper sensor device as recited in claim 17, wherein the weakened portion is a reduced cross-sectional area of the arm.

19. The gripper sensor device as recited in claim 17, wherein the weakened portion and the wire engagement section are in different planes.

20. The robotic gripper sensor device as recited in claim 17, wherein in an initial unstressed position, in which the wire engagement section is not in contact with the respective fine wires, the probe engagement section is provided in contact with the sensor probe.

* * * * *